United States Patent [19]
Hikosaka et al.

[11] Patent Number: 5,519,509
[45] Date of Patent: May 21, 1996

[54] IMAGE PROCESSING METHOD UTILIZING ERROR DIFFUSION TECHNIQUE

[75] Inventors: Ariyoshi Hikosaka; Tetsuji Kajitani, both of Osaka; Hideo Azumai, Toyonaka; Satoshi Iwatsubo, Osaka, all of Japan

[73] Assignee: Mita Industrial Co., Ltd., Osaka, Japan

[21] Appl. No.: 367,832

[22] Filed: Jan. 3, 1995

[30] Foreign Application Priority Data

Jan. 13, 1994 [JP] Japan .................................. 6-002199

[51] Int. Cl.⁶ .................................................. H04N 1/405
[52] U.S. Cl. ........................ 358/456; 358/465; 382/252
[58] Field of Search .................................... 358/457, 458, 358/463, 466, 445, 447; 382/272; 282/252

[56] References Cited

U.S. PATENT DOCUMENTS

| | | | |
|---|---|---|---|
| 4,958,238 | 9/1990 | Katayama et al. | 382/252 |
| 5,014,333 | 5/1991 | Miller et al. | 382/252 |

Primary Examiner—Scott A. Rogers
Assistant Examiner—Shahreen Ali
Attorney, Agent, or Firm—Beveridge, DeGrandi Weilacher & Young

[57] ABSTRACT

The present invention provides a half-tone image processing method utilizing an error diffusion technique which allows for the density adjustment of a half-tone image to be reproduced. When the density of an object pixel is converted into binary-coded data, a binary-coding object value is first calculated by adding a density value of the object pixel to an error sum of binary-coding errors distributed to the object pixel from peripheral pixels around the object pixel. Then, the binary-coding object value is compared with a threshold value TH for judging whether the object pixel is a black pixel or a white pixel. The binary-coding object value is also compared with a reference value GSLVB or GSLVW which can be variably set for the calculation of a binary-coding error HG of the object pixel. The level of the binary-coding error HG can be adjusted by variably setting the reference values GSLVB and GSLVW. Thus, the density adjustment of a half-tone image can be realized.

6 Claims, 5 Drawing Sheets

IMAGE PROCESSING METHOD UTILIZING ERROR DIFFUSION TECHNIQUE

CROSS REFERENCE TO RELATED APPLICATION

This application claims priority benefits under 35 U.S.C. §119 of Japanese Patent Application No. 2199/1994, the disclosures of which are incorporated herein by reference.

BACKGROUND OF THE INVENTION

1. Field of the Invention

The present invention relates to image processing methods for processing multivalued density data of an optically read image for half-tone image reproduction, which can be applied to such image processing apparatuses as a facsimile machine and image scanner.

2. Description of the Related Art

Conventionally, image processing apparatuses such as a facsimile machine for reproducing an optically read image as a binary-coded image employ various gray scale image processing methods to reproduce half-tone images such as photograph. One of such half-tone image processing methods is an error diffusion technique.

In accordance with the error diffusion technique, when the density of an object pixel is converted into binary-coded data, a binary-coding error (which means a difference between the multivalued density data before the binary-coding of the pixel and the density data after the binary-coding) is calculated. In the binary-coding process, the density data of the object pixel is compared with a predetermined threshold value, and then it is determined whether the pixel is a black pixel or a white pixel. Therefore, the binary-coding of a pixel having an intermediate density data inevitably accompanies an error or a difference between the density data before and after the binary-coding.

The binary-coding error is properly weighted and distributed to peripheral pixels. In the binary-coding process of one object pixel, the density data of the object pixel and binary-coding errors distributed from the peripheral pixels are summed, and the sum is compared with a predetermined binary-coding threshold value.

Figure 2:
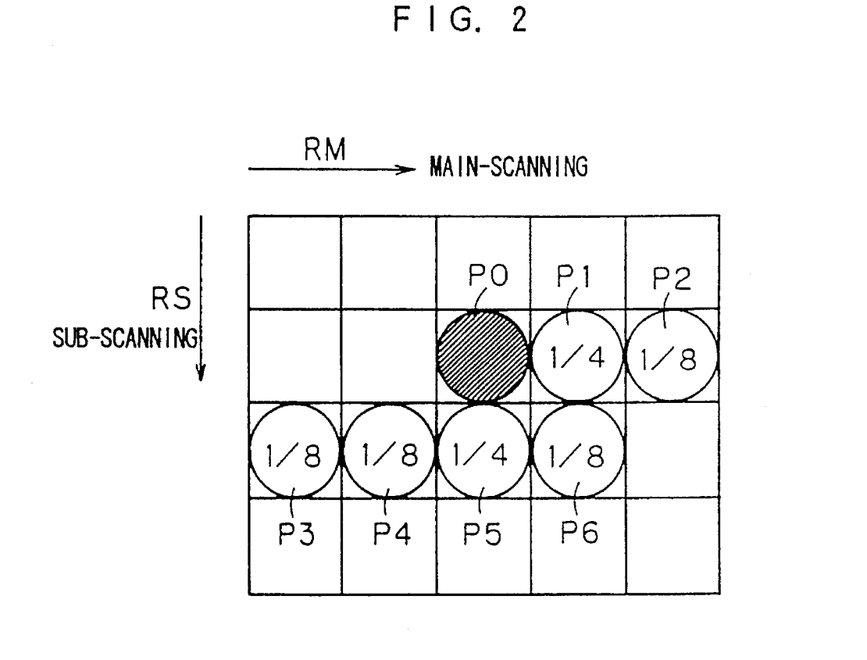
FIG. 2 is a diagram for explaining an error diffusion processing.

For example, when a reading operation is carried out in a main scanning direction by a scanner of a facsimile machine or the like, and the density of a pixel P0 located on a line extending in the main scanning direction as shown in FIG. 2 is converted into a binary-coded data, the aforementioned binary-coding error occurs. This binary-coding error is multiplied by an error diffusion coefficient of ¼ or ⅛, and distributed to peripheral pixels P1 to P6 around the pixel P0.

Figure 3:
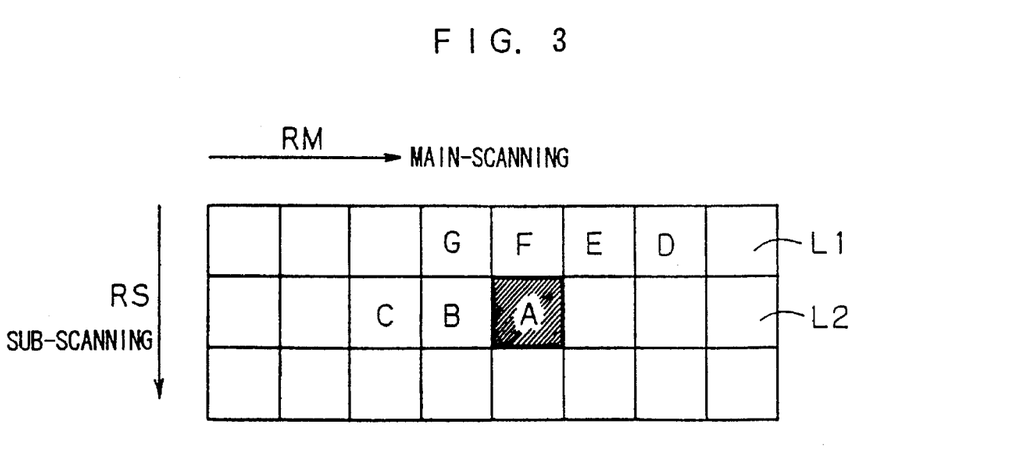
FIG. 3 is a diagram for explaining an error diffusion processing.

With a focus on one object pixel to which binary-coding errors are distributed, on the other hand, binary-coding errors of peripheral pixels B, C, D, E, F and G are distributed to the object pixel A, as shown in FIG. 3. Therefore, the binary-coding process for the object pixel A is based on a sum obtained by adding an error sum of binary-coding errors distributed to the object pixel A from the peripheral pixels B, C, D, E, F and G to the density data of the object pixel A.

Thus, the half-tone image reproduction is achieved by distributing a binary-coding error of each pixel to the peripheral pixels.

The binary-coding process is performed on the basis of a predetermined threshold value. If 256-scale multivalued data (white: 0, black: 255) is to be converted into binary-coded data, for example, the binary-coding threshold value is set to the median value therebetween, i.e., 128. The judgement of whether the object pixel is a white pixel or a black pixel is based on the density value of the object pixel A and the error sum obtained by adding up the binary-coding errors distributed to the object pixel A from the peripheral pixels B, C, D, E, F and G, with reference to the following inequalities (1) and (2).

Black judgement:

$$\text{(Error sum)} + \text{(Density value of object pixel)} \geq 128 \quad (1)$$

White judgement:

$$\text{(Error sum)} + \text{(Density value of object pixel)} < 128 \quad (2)$$

After the binary-coding process, the binary-coding error of the object pixel is calculated from the following equation (3) or (4).

Black judgement: (Binary-coding error) = (3)

(Error sum) + (Density value of object pixel) − 255

White judgement: (Binary-coding error) = (4)

(Error sum) + (Density value of object pixel) − 0

As described above, the binary-coding process is carried out on the basis of a predetermined threshold value. The binary-coding process based on the predetermined threshold value is advantageous in that the errors are balancedly distributed over the pixels. However, this binary-coding process has a disadvantage that the density of a half-tone image cannot be intentionally modified. That is, the half-tone image cannot be intentionally modified into a more whitish or blackish image. Therefore, it is difficult to correct a variation in image processing characteristics among different apparatuses, and to reproduce an image with a proper density according to an original image or the preference of a user.

SUMMARY OF THE INVENTION

To solve the aforesaid technical problem, it is an object of the present invention to provide an image processing method utilizing an error diffusion technique which allows for the density adjustment of a half-tone image to be reproduced.

In accordance with the present invention, there is provided an image processing method, comprising the steps of:

distributing binary-coding errors caused when multivalued density data of respective pixels of an image are converted into binary-coded data to peripheral pixels having a predetermined positional relation with respect to the respective pixels;

calculating an error sum by adding up binary-coding errors distributed to an object pixel from the peripheral pixels around the object pixel;

comparing an addition result obtained by adding a density value of the object pixel to the error sum calculated for the object pixel with a predetermined binary-coding threshold value, and obtaining binary-coded density data of the object pixel based on a comparison result; and comparing the addition result obtained by adding the density value of the object pixel to the error sum calculated for the object pixel with predetermined reference values which can be variably set, and calculating a binary-coding error for the object pixel.

In the image processing method according to the present invention, the addition result obtained by adding the density value of the object pixel to the error sum is compared with the predetermined reference values which can be variably set, and the binary-coding error is calculated based on the comparison result. Therefore, the level of the binary-coding error can be variably adjusted. This means that, when the density data of an object pixel is converted into binary-coded data, the level of an error sum to be added to the density value of the object pixel can be variably changed and, therefore, the appearance frequencies of the respective binary values after the binary-coding can be changed. Accordingly, the density of a half-tone image obtained through the half-tone image processing utilizing the error diffusion technique after the binary-coding process can be modified by changing the aforesaid reference values.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a block diagram illustrating the construction for variably setting reference and the like.

DETAILED DESCRIPTION OF THE PREFERRED EMBODIMENTS

Figure 1:
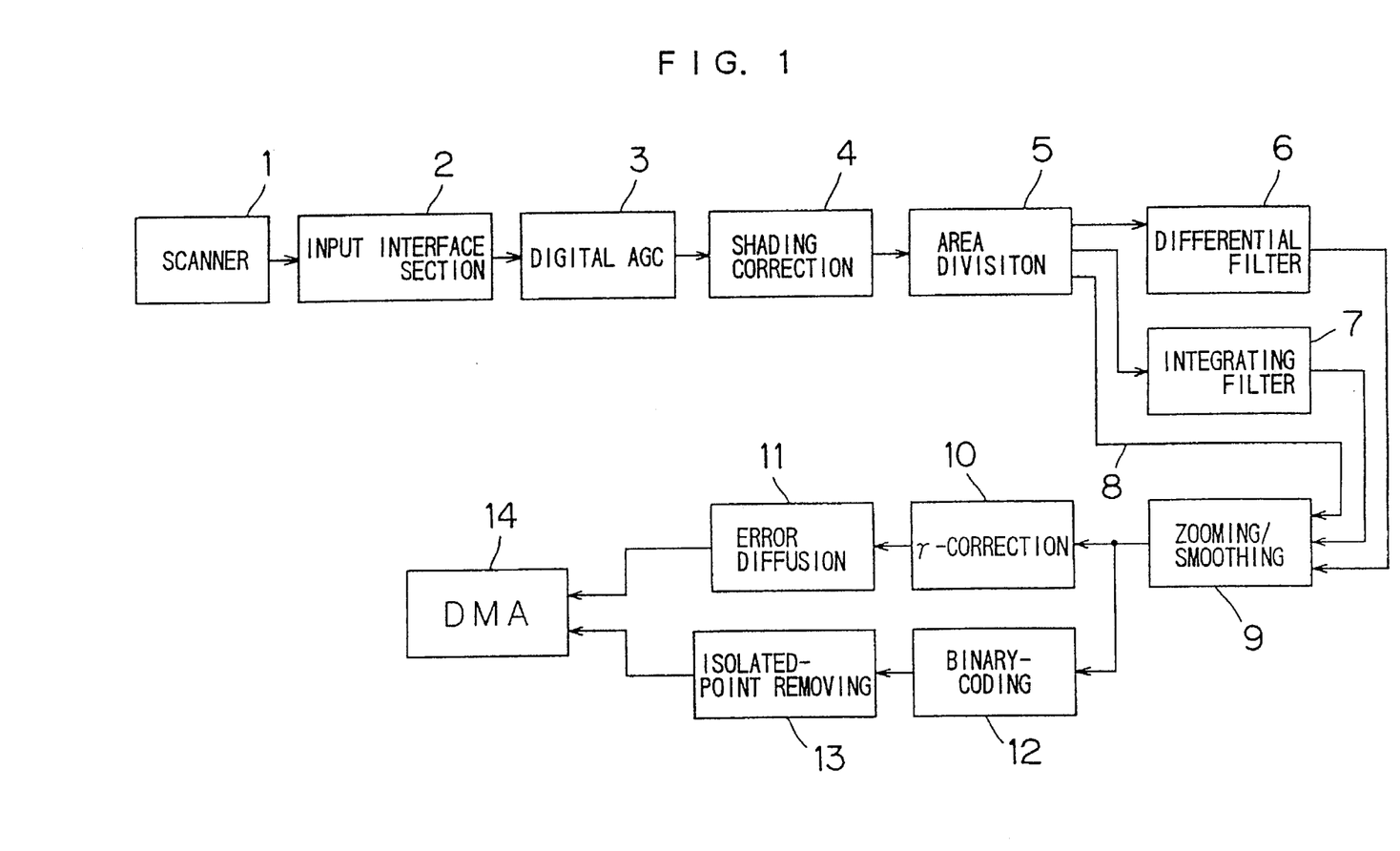
FIG. 1 is a block diagram illustrating the electrical construction relating to an image processing of a facsimile apparatus to which a first embodiment of the present invention is applied.

FIG. 1 is a block diagram illustrating the electrical construction relating to an image processing of a facsimile apparatus to which a first embodiment of the present invention is applied. A document original set on the facsimile apparatus is read by means of a scanner 1. The scanner 1 comprises such an image sensor as a CCD image sensor or CIS image sensor for reading images. Examples of the image sensor include an area image sensor for reading two-dimensional data and linear image sensor for reading line data. Typically, the linear image sensor is employed for constructing a less expensive apparatus.

The image data of the document original read by the scanner 1 is sent to an input interface section 2, which carries out such a processing operation as signal sample-hold processing. In accordance with this embodiment, the input interface section 2 comprises an analog circuit and, therefore, the aforesaid processing operation is performed on an analog basis.

The image data processed by the input interface section 2 is sent to a digital AGC circuit 3 to perform a gain control to adjust the level of a signal (image data signal) within a desired range and convert an analog signal into a digital signal.

The image data subjected to the gain control is sent to a shading correction circuit 4, in which a shading distortion is alleviated or removed. The shading distortion means unevenness in the density among pixels resulting from uneven illumination of a light source used for reading a document original by means of the scanner 1.

The image data, after having alleviated or removed shading distortion, is sent to an area division circuit 5. In the area division circuit 5, it is judged whether the image data to be inputted is character image data generated by reading characters, photographic image data generated by reading a photograph, or dot image data generated by reading a printed photograph such as a news paper or magazine.

If the input image data includes a plurality of image data types, i.e., character image data, photographic image data and dot image data, areas including respective image data types are divided.

The area division based on the type of image data ensures suitable processing operations for the respective image data types in the subsequent process.

The output side of the area division circuit 5 is connected in parallel to a differential filter 6, integrating filter 7 and pass-through circuit 8 (a circuit for passing through signals without performing any processing) so that different processing operations are carried out depending on the type of the image data subjected to the area division processing. The character image data separated from the other image data types is sent to the differential filter 6, in which the profile of the character image is rendered distinct. The dot image data is sent to the integrating filter 7, in which the dot image data is smoothed. Data other than the character image data and dot image data, i.e., photographic image data, is sent to the pass-through circuit 8, and then sent to the next circuit without being subjected to any processing. Thus, the image data are subjected to predetermined processing operations or not subjected to any processing operation, depending on the image data types.

These data are sent to a zooming/smoothing circuit 9. If the image is to be enlarged or reduced, the zooming/smoothing circuit 9 performs an enlarging or reducing processing and a correction processing for correcting image distortion accompanied therewith. If the image is not to be enlarged or reduced, the image data is not subjected to any processing in the zooming/smoothing circuit 9.

The image data subjected to the foregoing process are further processed in accordance with either one of the following processes, which differs depending on the image data types.

If the image data is photographic image data or dot image data which is to be subjected to a half-tone output processing, the image data is sent to a γ-correction circuit 10, in which the sensitivity characteristic of the image data is corrected suitably for the vision characteristic of human eyes. Further, the image data is sent to an error diffusion circuit 11, and processed for high-quality half-tone image reproduction.

On the other hand, if the image data is character image data which is to be subjected to a binary-coding process, the image data is sent to a binary-coding circuit 12. In the binary-coding circuit 12, the slice level for binary-coding is adjusted, and characters, diagrammatic drawings and similar images are distinguished from the background. At this time, an automatic density-adjusting processing is also carried out for the optimization of the image density.

An output of the binary-coding circuit 12 is sent to an isolated-point removing circuit 13, in which isolated black and white points and the like resulting from noise are removed.

The image data subjected to the foregoing process is sent to a DMA (Direct Memory Access) circuit 14 and then to a transmission circuit or printing circuit (not shown).

Among the aforesaid processing operations, the processing in the error diffusion circuit 11 is the main subject of this embodiment.

FIG. 2 is a diagram for explaining the processing in the error diffusion circuit 11. In the error diffusion process, when the density of one pixel P0 is converted into a binary-coded data, a binary-coding error is calculated in a manner which will be described later, based on the multivalued density data and the binary-coded data (white or black) of the pixel P0, and the binary-coding error is distributed at a predetermined distribution rate to the peripheral pixels around the pixel P0.

In this embodiment, the binary-coding error of the pixel P0 is multiplied by a coefficient of ¼ and distributed to pixels P1 and P5 respectively located adjacent the pixel P0 on the downstream side in a main scanning direction RM and in sub-scanning direction RS along which image reading operation is carried out by the scanner 1. Further, the binary-coding error of the pixel P0 is multiplied by a coefficient of ⅛ and distributed to a pixel P2 located adjacent the pixel P1 on the downstream side in the main scanning direction RM, to pixels P3 and P4 located upstream of the pixel P5 in the main scanning direction RM, and to a pixel P6 located adjacent the pixel P5 on the downstream side in the main scanning direction RM.

In the error diffusion process for an object pixel, errors distributed from peripheral pixels are added to the density data of the object pixel, and the addition result is subjected to the binary-coding process.

With a focus on an object pixel A, this process will be described below with reference to FIG. 3. Binary-coding errors HG(G), HG(E) and HG(D) of pixels G, E and D in a preceding scanning line L1 are multiplied by a coefficient of ⅛. A binary-coding error HG(F) of a pixel F is multiplied by a coefficient of ¼. A binary-coding error HG(B) of a pixel B located adjacent the object pixel A on the upstream side in a current scanning line L2 along the main scanning direction RS is multiplied by a coefficient of ¼. A binary-coding error HG(C) of a pixel C located upstream of the pixel B in the main scanning direction RS is multiplied by a coefficient of ⅛. Then, all the binary-coding errors multiplied by the predetermined coefficients are distributed to the object pixel A.

In the binary-coding process for the object pixel A, an error sum RG(A) is calculated by adding up the aforesaid errors distributed to the object pixel A, based on the following equation (5):

$$RG(A)=1/4\{HG(F)+HG(B)\}+1/8\{HG(G)+HG(E)+HG(D)+HG(C)\} \quad (5)$$

A binary-coding object value T(A) is calculated by adding the error sum RG(A) to density data GOUT(A) of the object pixel A sent from the γ-correction circuit 10, based on the following equation (6):

$$T(A)=GOUT(A)+RG(A) \quad (6)$$

Then, the binary-coding object value T(A) is compared with a predetermined binary-coding threshold value TH for the binary-coding of the density data of the object pixel A.

That is, a judgement is made based on the following inequalities (7) and (8) for the binary-coding of the density data of the object pixel A.

Black judgement: $T(A) \geqq TH$ (7)

White judgement: $T(A) < TH$ (8)

In case that the multivalued density data before the binary-coding is expressed on a 256-scale basis (0 to 255, white: 0, black: 255), for example, the binary threshold value TH is set to 128 (TH=128).

On the other hand, the binary-coding error HG(A) of the object pixel A is calculated from one of the following equations (9) or (10). That is, the added sum of the error sum RG(A) and the multivalued density data GOUT(A) of the object pixel A is compared with a reference value GSLVB or GSLVW for obtaining the binary-coding error HG(A).

Black judgement: $HG(A)=GOUT(A)+RG(A)-GSLVB$ (9)

White judgement: $HG(A)=GOUT(A)+RG(A)-GSLVW$ (10)

Though the reference values are fixed, i.e., GSLVB=255 and GSLVW=0 in accordance with the aforementioned related art, these reference values can be variably set in this embodiment. For example, the following settings (a) to (d) are available.

(a) GSLVW=0, GSLVB>255
(b) GSLVW=0, GSLVB<255
(c) GSLVB=255, GSLVW<0
(d) GSLVB=255, GSLVW>0

Figure 4A:
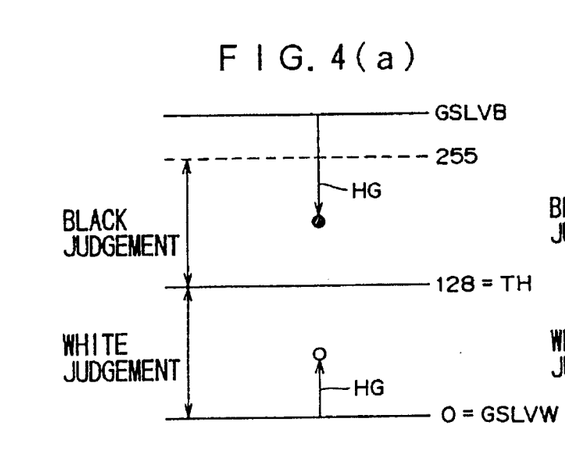
FIGS. 4(a), 4(b), 4(c) and 4(d) are diagrams for explaining a method of calculating a binary-coding error.

FIG. 4(a) is a diagram for explaining a case in which the reference values GSLVB and GSLVW have the setting (a). Provided that the binary-coding threshold value TH is set to 128, for example, it is judged that the object pixel is a white pixel if a binary-coding object value T obtained by adding an error sum RG to a density value GOUT of the object pixel is in a range between 0 and 128 ($0 \leqq T \leqq 128$), and it is judged that the object pixel is a black pixel if the binary-coding object value T is in a range between 128 and 255 ($128 \leqq T \leqq 255$).

In case that the reference values GSLVB and GSLVW have the aforesaid setting (a), the binary-coding error HG (negative value) of a pixel judged to be a black pixel is smaller than that obtained in case of GSLVB=255 (or the absolute value of the former is greater than that of the latter). Therefore, the error sum RG is generally reduced, and the number of pixels judged to be white pixels is increased. As a result, a half-tone image finally reproduced is more whitish. As the reference value GSLVB becomes greater, this tendency becomes more remarkable.

Figure 4B:
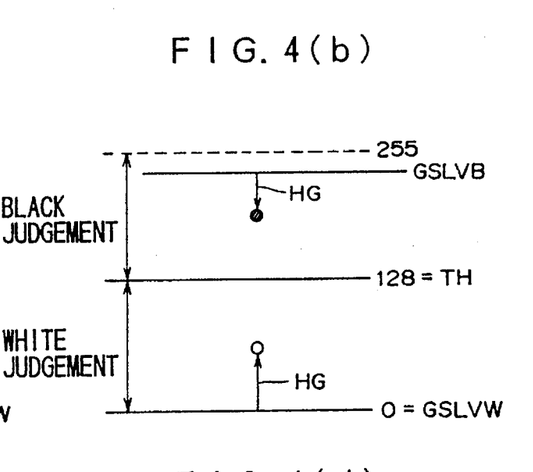

FIG. 4(b) is a diagram for explaining a case in which the reference values GSLVB and GSLVW have the setting (b). In this case, the binary-coding error HG of a pixel judged to be a black pixel is greater than that obtained in case of GSLVB=255 (or the absolute value thereof is smaller). Therefore, the error sum RG is generally increased, and the number of pixels judged to be black pixels is increased. As a result, a reproduced half-tone image is more blackish. As the reference value GSLVB becomes smaller, this tendency becomes more remarkable.

Figure 4C:
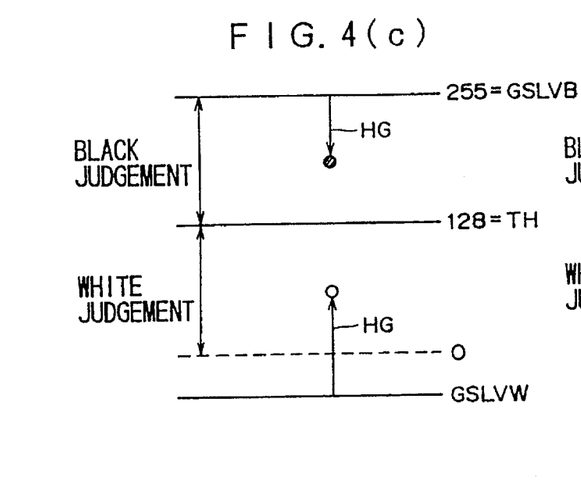

FIG. 4(c) is a diagram for explaining a case in which the reference values GSLVB and GSLVW have the setting (c). In this case, the binary-coding error HG (positive value) of a pixel judged to be a white pixel is greater than that obtained in case of GSLVW=0. Therefore, the number of pixels judged to be black pixels is increased, and a reproduced half-tone image is more blackish. As the reference value GSLVW becomes smaller, this tendency becomes more remarkable.

Figure 4D:
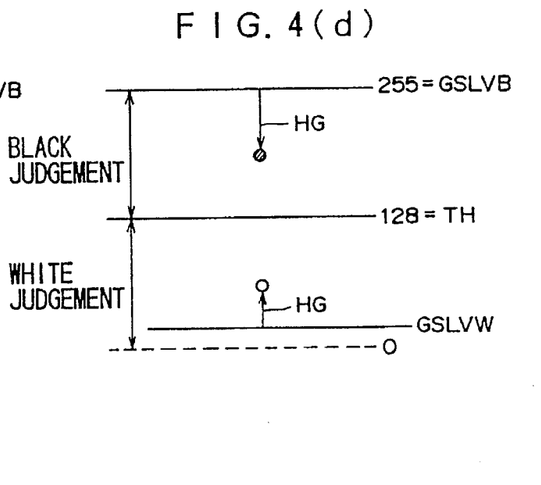

FIG. 4(d) is a diagram for explaining a case in which the reference values GSLVB and GSLVW have the setting (d).

In this case, the binary-coding error HG of a pixel judged to be a white pixel is smaller than that obtained in case of GSLVW=0. Therefore, the number of pixels judged to be black pixels is decreased, and a reproduced half-tone image is more whitish. As the reference value GSLVW becomes greater, this tendency becomes more remarkable.

In case that the calculation method of the binary-coding error of the object pixel is modified in the aforementioned manner, however, the calculated binary-coding error may become greater for the pixels having an original color of black or white and judged to have the original color. Therefore, the fidelity of the reproduction of black and white solid regions may be deteriorated.

This problem can be overcome by modifying the calculation method of the binary-coding error HG in accordance with the binary-coding object value T (the density value GOUT of the object pixel plus the error sum RG) employed for the binary-coding of the density of the object pixel. That is, the calculation method of the binary-coding error HG is modified on the basis of whether or not the binary-coding object value T satisfies a predetermined condition.

More specifically, if the binary-coding object value T satisfies the following inequality (11), the binary-coding error HG is set to zero (HG=0), and if the binary-coding object value T does not satisfy the inequality (11), the binary-coding error HG is calculated from the aforesaid equation (9) or (10).

$$T \geq 255 \text{ or } T \leq 0 \tag{11}$$

By employing this method, the binary-coding error HG of a pixel having an original color of black or white can be zero. Thus, the fidelity of the density reproduction of the solid regions can be improved, while a high-quality half-tone image reproduction can be realized.

Figure 5:
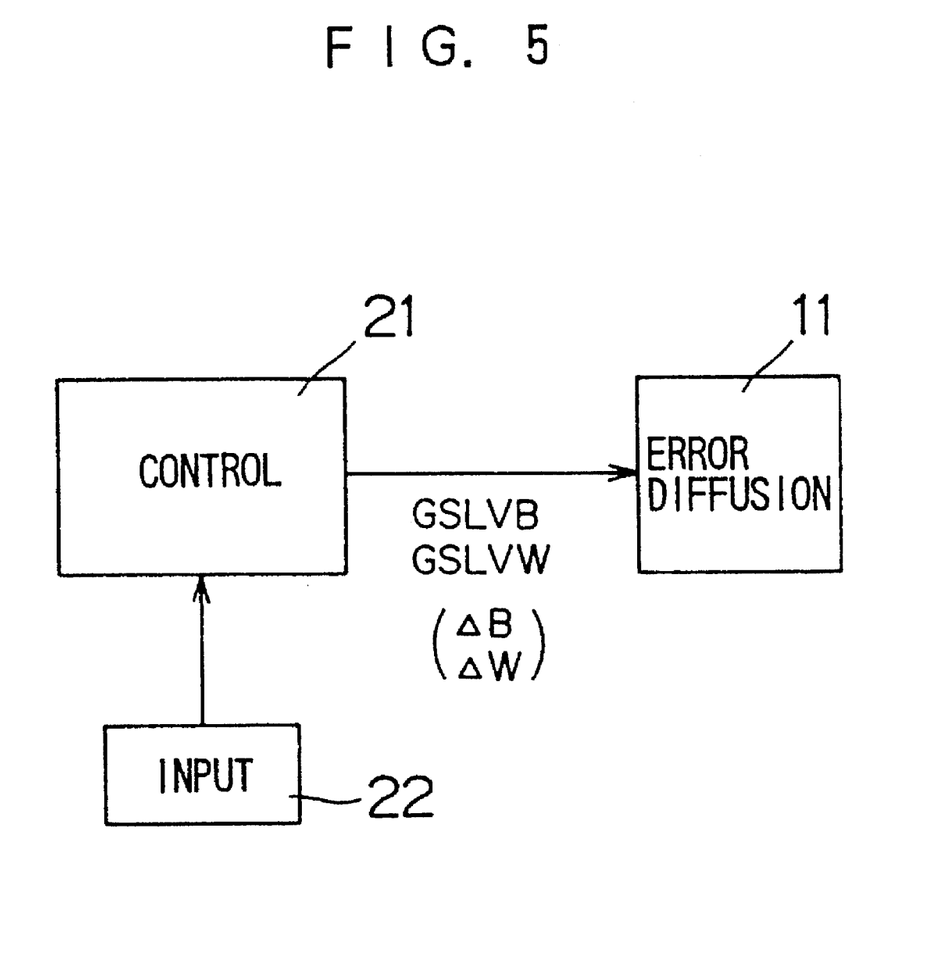

FIG. 5 is a block diagram illustrating a construction for variably setting the reference values GSLVB and GSLVW. The reference values GSLVB and GSLVW are sent to the error diffusion circuit 11 from a control circuit 21 including a microprocessor. These reference values are retained in a register (not shown) disposed in the error diffusion circuit 11. An input section 22 including a key input device and the like is connected to the control circuit 21. The reference values GSLVB and GSLVW can be variably set by the input operation from the input section 22. The input section 22 may be fitted onto the main body of the facsimile apparatus or, alternatively, attached thereto as a peripheral when the reference values GSLVB and GSLVW are to be set.

In the half-tone processing utilizing the error diffusion technique according to this embodiment, the density of the half-tone image to be reproduced can be intentionally adjusted by variably setting the reference values GSLVB and GSLVW when the binary-coding errors are calculated. Thus, a variation in the characteristics among different facsimile apparatuses can be eliminated, and the density of a half-tone image can be reproduced according to the kind of original images and the preference of a user. Further, if the data correction performed by the γ-correction circuit 10 is insufficient, the insufficient correction can be compensated through the density adjustment by variably setting the reference values GSLVB and GSLVW.

Instead of variably setting the reference values GSLVB and GSLVW, the density of the half-tone image can be otherwise modified to some extent by changing the binary-coding threshold value TH. However, even if the binary-coding threshold value TH is changed, the binary-coding error is calculated only within a dynamic range between 0 and 255, and the magnitude of the binary-coding error can not be significantly changed. Accordingly, the change in the binary-coding threshold value TH does not significantly influence the density of the half-tone image finally obtained. In accordance with the previously discussed embodiment, on the other hand, the binary-coding error can be changed without being restricted by the dynamic range of 0 to 255. Thus, the density of the half-tone image can be effectively modified.

The setting of the reference values GSLVB and GSLVW is not limited to the aforesaid settings (a) to (d). Although one of the reference values GSLVB and GSLVW is fixed and the other is variable in the settings (a) to (d), both of the reference values GSLVB and GSLVW can be variably set for the density modification of the half-tone image.

Next, a second embodiment of the present invention will be hereinafter described. This embodiment is different from the first embodiment only in the calculation method of the binary-coding error, and the other process is substantially the same. Therefore, only the calculation method of the binary-coding error will be described here.

In accordance with this embodiment, the binary-coding error HG(A) of the object pixel A is calculated from the following equations (12) and (13):

$$\text{Black judgement: } HG(A)=\{T(A)+\Delta B\}-REFB \tag{12}$$

$$\text{White judgement: } HG(A)=\{T(A)+\Delta W\}-REFW \tag{13}$$

where T(A)=GOUT(A)+RG(A), REFB and REFW are constants, e.g., REFB=255 and REFW=0, and ΔB and ΔW are predetermined values which can be variably set. It is apparent that the aforesaid equations (9) and (10) can be obtained by replacing these constants and variables in the following manner and, therefore, this embodiment provides substantially the same function and effect as the aforesaid first embodiment.

REFB–ΔB→GSLVB
REFW–ΔW→GSLVW

That is, if (REFB–ΔB) and (REFQ–ΔW) are considered to be the reference values, this embodiment is equivalent to the aforesaid first embodiment. In other words, by changing the binary-coding object value T by ΔB or ΔW, the reference values to be employed for the calculation of the binary-coding error HG are changed correlatively with the binary-coding object value T in accordance with this embodiment.

In this case, the following settings (i) to (iv) are employed:

(i) ΔW=0, ΔB<0
(ii) ΔW=0, ΔB>0
(iii) ΔB=0, ΔW>0
(iv) ΔB=0, ΔW<0

Figure 6A:
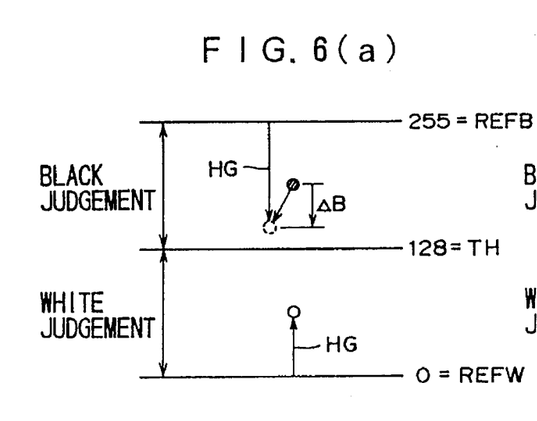
FIGS. 6(a), 6(b), 6(c) and 6(d) are diagrams for explaining a method of calculating a binary-coding error according to a second embodiment of the present invention.

FIG. 6(a) is a diagram for explaining a case in which the predetermined values ΔB and ΔW have the setting (i). In this case, a value that is smaller than the binary-coding object value T(A) by an absolute value |ΔB| is compared with the constant REFB for the calculation of the binary-coding error HG of a pixel judged to be a black pixel. Accordingly, the binary-coding error HG (negative value) of the pixel judged to be a black pixel is smaller than that obtained in case of ΔB=0 (or the absolute value of the former is greater than that of the latter). Therefore, the error sum RG is generally reduced, and the number of pixels judged to be white pixels is increased. As a result, a half-tone image finally reproduced is more whitish. As the predetermined value ΔB becomes smaller (or |ΔB| becomes greater), this tendency becomes more remarkable.

Figure 6B:
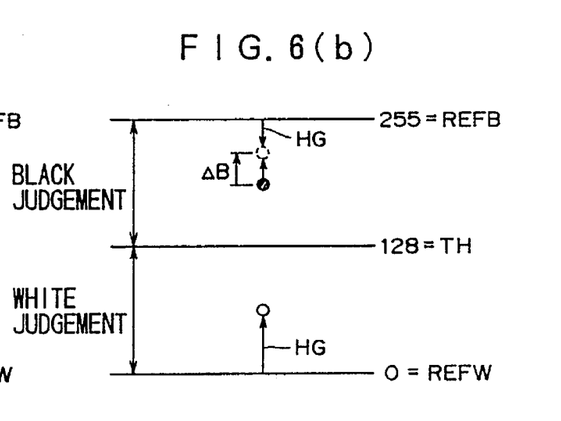

FIG. 6(b) is a diagram for explaining a case in which the predetermined values ΔB and ΔW have the setting (ii). In this case, a value that is greater than the binary-coding object value T(A) by an absolute value |ΔB| is compared with the constant REFB for a pixel judged to be a black pixel. Accordingly, the binary-coding error HG of the pixel judged to be a black pixel is greater than that obtained in a case of ΔB=0 (or the absolute value thereof is smaller). Therefore, the error sum RG is generally increased, and the number of pixels judged to be black pixels is increased. As a result, a reproduced half-tone image is more blackish. As the predetermined value ΔB becomes greater, this tendency becomes more remarkable.

Figures 6C, 6D:
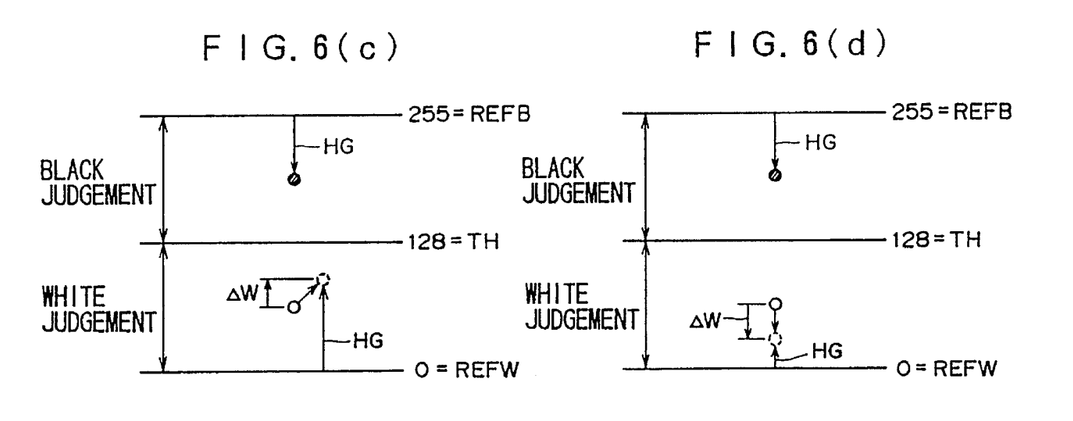

FIG. 6(c) is a diagram for explaining a case in which the predetermined values ΔB and ΔW have the setting (iii). In this case, a value that is greater than the binary-coding object value T(A) by a value ΔW is compared with the constant REFW for a pixel judged to be a white pixel. Accordingly, the binary-coding error HG (positive value) of the pixel judged to be a white pixel is greater than that obtained in a case of ΔW=0. Therefore, the number of pixels judged to be black pixels is increased, and a reproduced half-tone image is more blackish. As the predetermined value ΔW becomes greater, this tendency becomes more remarkable.

FIG. 6(d) is a diagram for explaining a case in which the predetermined values ΔB and ΔW have the setting (iv). In this case, a value that is smaller than the binary-coding object value T(A) by an absolute value |ΔW| is compared with the constant REFW for a pixel judged to be a white pixel. Accordingly, the binary-coding error HG of the pixel judged to be a white pixel is smaller than that obtained in a case of ΔW=0, and the number of pixels judged to be black pixels is decreased. As a result, a reproduced half-tone image is more whitish. As the predetermined value ΔW becomes smaller (or |ΔW| becomes greater), this tendency becomes more remarkable.

The fidelity of the density reproduction of the solid regions can be improved through the same processing as described in the aforesaid first embodiment. The variable setting of the predetermined values ΔB and ΔW can be realized by employing the construction shown in FIG. 5. That is, the predetermined values ΔB and ΔW are sent to the error diffusion circuit 11 from the control circuit 21.

The half-tone image processing utilizing the error diffusion technique according to this embodiment also allows for the density adjustment of the half-tone image to be reproduced, thereby realizing the same effect as described in the aforesaid first embodiment.

While the present invention has been particularly shown and described by way of the embodiments, it should be understood that the present invention is not limited to the specifics described in the embodiments. For instance, though the foregoing embodiments have taken an example of a facsimile apparatus, the present invention can be widely applied to such apparatuses as an image scanner and digital copying apparatus which are adapted to process image data obtained through optical image reading. It should be also understood that a variety of design modifications can be made without departing from the spirit and scope of the present invention, as defined in the attached claims.

We claim:

1. An image processing method utilizing an error diffusion technique, comprising the steps of:
   (a) distributing binary-coding errors, generated when multivalued density data of respective pixels of an image are converted into binary-coded data, to peripheral pixels having a predetermined positional relation with respect to the respective pixels;
   (b) calculating an error sum by adding up binary-coding errors distributed to an object pixel from peripheral pixels around the object pixel;
   (c) comparing an addition result obtained by adding a density value of the object pixel to the error sum calculated for the object pixel with a predetermined binary-coding threshold value, and obtaining binary-coded density data of the object pixel based on a comparison result; and
   (d) comparing the addition result obtained by adding the density value of the object pixel to the error sum calculated for the object pixel with predetermined reference values which can be variably set, and calculating a binary-coding error for the object pixel.

2. An image processing method utilizing an error diffusion technique as set forth in claim 1, further comprising, between the steps (c) and (d), the steps of:
   (e) judging whether or not the addition result satisfies a predetermined condition; and
   (f) assigning a predetermined constant value to the binary-coding error of the object pixel if the addition result satisfies the predetermined condition;
wherein the step (d) is carried out only if the addition result does not satisfy the predetermined condition.

3. An image processing method utilizing an error diffusion technique as set forth in claim 1, wherein different values are assigned to the predetermined reference values which can be variably set in the step (d), depending on whether the object pixel is judged to be a black pixel or a white pixel in the step (c).

4. An image processing method utilizing an error diffusion technique as set forth in claim 2, wherein different values are assigned to the predetermined reference values which can be variably set in the step (d), depending on whether the object pixel is judged to be a black pixel or a white pixel in the step (c).

5. An image processing method utilizing an error diffusion technique as set forth in claim 4, wherein, if it is judged in step (e) that the addition result is not less than a predetermined relatively large value or not greater than a predetermined relatively small value, there is no binary-coding error, and a value of zero is assigned to the binary-coding error in the step (f).

6. An image processing method utilizing an error diffusion technique as set forth in claim 5, wherein the predetermined relatively large value and the predetermined relatively small value in the step (e) are a maximum value and minimum value, respectively, of multivalued density data of the pixels.

* * * * *